US007804620B2

United States Patent
Turner et al.

(10) Patent No.: US 7,804,620 B2
(45) Date of Patent: Sep. 28, 2010

(54) METHOD AND ARRANGEMENT FOR GENERATING A DOT MATRIX IMPRINT WITH CONTROL USING RANDOM OUTPUT AND PROBABILITY

(75) Inventors: Olaf Turner, Berlin (DE); Uwe Hübler, Neuenhagen (DE); Jens Hertlein, Wildau (DE); Axel Kieser, Berlin (DE)

(73) Assignee: Francotyp-Postalia GmbH (DE)

( * ) Notice: Subject to any disclaimer, the term of this patent is extended or adjusted under 35 U.S.C. 154(b) by 501 days.

(21) Appl. No.: 11/828,654

(22) Filed: Jul. 26, 2007

(65) Prior Publication Data

US 2008/0024800 A1 Jan. 31, 2008

(30) Foreign Application Priority Data

Jul. 26, 2006 (DE) .................. 10 2006 035 254

(51) Int. Cl.
*G06K 15/10* (2006.01)
*H04N 1/387* (2006.01)
*H04N 1/409* (2006.01)
*H04N 1/40* (2006.01)
*B41J 2/07* (2006.01)

(52) U.S. Cl. .................. 358/1.8; 358/2.1; 358/3.19; 358/3.24; 358/3.26; 358/3.27; 347/12

(58) Field of Classification Search .................. 358/1.9, 358/3.06, 3.13, 3.16, 3.19, 3.26, 3.21, 463, 358/466, 1.8, 2.1, 3.24, 502; 347/12, 14
See application file for complete search history.

(56) References Cited

U.S. PATENT DOCUMENTS

| | | | | | |
|---|---|---|---|---|---|
| 4,482,923 | A | * | 11/1984 | Fischer et al. | 358/3.19 |
| 4,485,397 | A | * | 11/1984 | Scheuter et al. | 382/199 |
| 4,959,730 | A | * | 9/1990 | Tai et al. | 358/3.19 |
| 5,278,672 | A | * | 1/1994 | Shimazaki | 358/3.21 |
| 5,563,985 | A | | 10/1996 | Klassen et al. | |
| 5,739,828 | A | | 4/1998 | Moriyama et al. | |
| 5,742,300 | A | | 4/1998 | Klassen | |
| 5,818,474 | A | * | 10/1998 | Takahashi et al. | 347/15 |
| 5,892,588 | A | * | 4/1999 | Samworth | 358/3.19 |
| 6,082,849 | A | | 7/2000 | Chang et al. | |
| 6,407,825 | B1 | | 6/2002 | Couwenhoven et al. | |

* cited by examiner

*Primary Examiner*—Scott A Rogers
(74) *Attorney, Agent, or Firm*—Schiff Hardin LLP

(57) ABSTRACT

In a method and arrangement for generation of an imprint with a printing device operating according to a dot matrix principle (in particular an inkjet principle), a dot pattern is provided for the imprint, with which the printing device image points corresponding to the provided dot pattern on a substrate. For at least one first image point a probability with which the image point is generated is provided. Whether this image point is actually generated on the substrate is determined in a decision step using a random generator and the probability. The image point is generated (or not) in a subsequent step dependent on the result of the decision step.

32 Claims, 2 Drawing Sheets

METHOD AND ARRANGEMENT FOR GENERATING A DOT MATRIX IMPRINT WITH CONTROL USING RANDOM OUTPUT AND PROBABILITY

BACKGROUND OF THE INVENTION

1. Field of the Invention

The present invention concerns a method for generation of an imprint with a printing device operating according to a dot matrix principle (in particular an inkjet principle) in which a dot pattern is provided for the imprint, and with which printing device image points corresponding to the provided dot pattern are generated on a substrate. The invention furthermore concerns a corresponding arrangement for generation of such an imprint.

2. Description of the Prior Art

In the creation of imprints according to such a dot matrix principle as is normally used, for example, in present-day franking machines, a good compromise must be found between the imprint quality (thus, for example, the area coverage of the imprint) and (given the use of ink) the flow of the ink and the consumption of the printing medium (thus, for example, of the ink).

In order to keep the ink consumption optimally low EP 0 720 919 A1 proposes to not print certain image points that would otherwise be printed corresponding to the provided dot pattern, in order to achieve a thinning of the imprint. The thinning is achieved by generating a type of checkerboard pattern in an actual region to be printed over its entire surface according to the provided dot pattern, with every first image point in a row or in a column being printed while every second image point is omitted (thus is not printed). This has the disadvantage that a possibly visible and therewith undesired regular (interfering) pattern occurs in the imprint.

In order to avoid irregular edges in an imprint, according to EP 0 720 919 A1 an edge sharpening algorithm is provided that should ensure that edge points defining a contour of the imprint are always printed, and furthermore the printing of two image points immediately next to one another in a line is prevented. This has the disadvantage that a stripe pattern arises in the region of the contour.

Furthermore, given the use of print heads with a number of nozzle rows that exhibit a higher resolution than the provided dot pattern, it is known to print the image points with only every other nozzle row. In order to achieve a higher area coverage, intervening image points are printed in turn according to a predetermined scheme. This also has the disadvantage that undesired regular patterns are hereby again generated in the imprint.

These regular patterns can in fact be avoided by the use of a distinctly higher ink quantity, for example by reduction of the omitted (i.e. unprinted) image points. This, however, can result in too much ink being applied, which is not only undesirable from an economic standpoint but also results in the problem that the imprint can smear.

A further disadvantage of the known methods is that the area coverage or the degree of thinning of the imprint can be varied only in a relatively complicated manner, by the use of a different thinning scheme or modification of the scheme in use.

SUMMARY OF THE INVENTION

An object of the present invention is to provide an arrangement for generation of an imprint of the aforementioned type that or does not exhibit, or exhibits to a lesser degree, the aforementioned disadvantages, and in particular enables in a simple manner a reduction of the required quantity of print medium while avoiding interfering regular patterns in the imprint.

The present invention is based on the insight that a reduction of the required quantity of print medium while avoiding interfering regular patterns in the imprint is achieved when, for a portion of the points of a dot pattern to be generated, the decision as to whether an image point is printed or not is made using a predeterminable probability for the printing of the appertaining image point and a random generator. Ultimately, the area coverage or the thinning of the achieved imprint, and therewith the consumed quantity of print medium (for example ink, toner, ink ribbon, etc.) can be set (adjusted) in a simple manner through the predeterminable probability for the printing, while the random generator ensures in a simple manner that no regular, interfering patterns develop in the appertaining region of the imprint.

According to the invention, a method for generation of an imprint with a printing device operating according to a dot matrix principle (in particular an inkjet principle) includes printing a dot pattern for the imprint and generating image points corresponding to the provided dot pattern on a substrate with the printing device. For at least one first image point, a first probability with which the first image point is generated is provided. Using a first random generator and the first probability it is then determined in a first decision step whether the first image point is generated. Finally, the first image point is generated in a subsequent printing step dependent on the result of the first decision step.

The probability with which a specific image point is generated can be predetermined centrally or once for all image points of a specific region of the imprint. In variants of the inventive method, for a second image point a second probability is determined with which the second image point is generated. In a second decision step, whether the second image point is generated is then determined using a second random generator and the second probability. Finally, the second image point is generated in a subsequent printing step dependent on the result of the second decision step. It is thus possible in a simple and advantageous manner to effect a differentiation of the respective image points.

The present invention can be used in a particularly advantageous manner when the resolution of the printing device is greater than the resolution of the provided dot pattern, such that a number of image points are associated with at least one point of the dot pattern (as is frequently the case in franking machines). In this case the present invention has a particularly advantageous effect because a corresponding thinning is normally required in order to save print medium. As described above, a simple regulation of the degree of the thinning and a reliable prevention of regular patterns are achieved with the invention. In further embodiments of the inventive method, the dot pattern exhibits a predetermined first resolution and the printing device exhibits a maximum second resolution that is greater than the first resolution. At least the first image point and the second image point are then associated with at least one first dot of the dot pattern. The second resolution is advantageously m times the first resolution, with m being a whole number, and m image points are associated with at least the first point.

As mentioned, the first probability and the second probability are predetermined independently of one another, and also exhibit different values. A particularly fine tuning of the printout is hereby possible. In variants of the inventive method that are particularly simple to realize, however, the second probability is set equal to the first probability. A separate intermediate step can be provided for this in which the second probability is set dependent on the specification for the first probability. As mentioned above, however, it is naturally likewise possible to provide only a single probability for all image points of a specific region.

Different random generators can be used for the first and second image points. In further variants of the inventive method that are preferred (because they are particularly simple to realize), the first random generator and the second random generator are identical.

The appropriate probability can be predetermined according to an arbitrary scheme. It is possible to predetermine this probability centrally for the entire imprint such that (in other words) it is provided for all associated image points of the imprint. However, in further variants of the inventive method the first probability and/or the second probability is/are predetermined dependent on the position of the first point in the dot pattern. It is thereby possible to provide a different area coverage or thinning for different regions of the imprint through the respective probability.

This location-dependent specification of the respective probability can in principle ensue according to arbitrary criteria. For example, it may be that a particularly high print quality must be achieved in specific regions of the imprint (for example for a later machine recognition of the imprint) while a lower print quality is acceptable in other regions of the imprint, and respective probabilities can be used in different regions to achieve that result.

The invention can be particularly advantageously used when the dot pattern contains different regions with different print image types, and the first probability and/or the second-probability is predetermined dependent on the print image type of the dot pattern at the location of the first point. For example, given a franking imprint that has a region with a one-dimensional barcode and/or a region with a two-dimensional barcode as well as a region with text and/or free graphics, respective, different first probabilities and, if applicable, a second probability, can be established for the different regions.

The respective probability with which a specific image point is printed can be predetermined in any suitable manner. For example, a specific number value can be predetermined that corresponds to the probability. In preferred variants of the inventive method, the first random generator generates first random numbers in a predetermined first number range and the first probability is predetermined by sub-dividing of the first number range into a first sub-range and at least one second sub-range. A first random number for the respective image point is then generated with the first random generator. In the first decision step it is finally established that the respective image point is generated in the printing step when the first random number lies within the first sub-range of the first number range, and the respective image point is not generated in the printing step when the first random number lies within the second sub-range of the first number range.

For example, the random generator can deliver whole-number random numbers in a range from 1 to 100 and, to establish a probability of x %, the first sub-range encompasses the numbers from 1 to x while the second sub-range encompasses the numbers from x+1 to 100.

However, it is understood that any other establishment of random numbers can ensue with which a decision is made as to whether respective image point is printed or not. A non-contiguous sub-division of the first number range can be used. For example, given a probability of 50% and whole-number random numbers, the appertaining image point should be printed given an even random number while it should not be printed given an odd random number.

The use of the appertaining probability and of the appertaining random generator can ensue sequentially in the printing of the imprint such that whether an image point is printed or not is decided for each image point using a value delivered by the random generator. In other variants of the inventive method, this determination is made in advance for at least one portion of the image points, and this determination is then queried (interrogated) at a later point in time in the framework of the decision only for the respective image point to be generated. This can ensue in any suitable manner.

Preferably a decision matrix is generated in advance for at least a sub-region of the dot pattern forming the first point, the decision matrix being generated using the first probability and the first random generator and the decision matrix establishing, for every image point associated with a point of the dot pattern, whether the image point is generated in the printing step. The decision matrix generated in this manner is then used in the decision step.

The use of the decision matrix can ensue in any suitable manner. A dot pattern matrix is preferably generated at least for the sub-region of the dot pattern comprising the first point, with a predetermined number of image points to be printed being associated with each point of the dot pattern to be printed. A print matrix is then generated in the respective decision step by a point-by-point linking of the dot pattern matrix with the decision matrix. In the printing step the image is finally generated using the print matrix. The linking of the decision matrix and the dot pattern matrix can ensue in any suitable manner. In the simplest case, the decision matrix and/or the dot pattern matrix is a binary matrix (for example with the values "0" and "1") and the linking is a simple logical "AND" linking. Arbitrary further linkings can be used with which additional decision criteria can be accounted for.

The decision matrix can be generated once and then remain unchanged, but preferably the decision matrix is generated anew at predeterminable intervals. These intervals can be arbitrary time-dependent or usage-dependent intervals. For example, as a usage-dependent interval, the decision matrix can be newly generated after each n-th imprint with $n \geq 1$.

An edge sharpening algorithm is additionally provided in preferred variants of the inventive method. The first probability and/or the second probability is/are predetermined dependent on whether the first point is an edge point defining a contour of the imprint. The first probability and/or the second probability is/are then set to at least 80%, preferably at least 90%, or 100% when the first point is an edge point defining a contour of the imprint.

In principle, any suitable method (using corresponding random algorithms) or devices that generate values with a sufficiently random distribution can be used for the random generator. Due to the particularly simple implementation, at least one of the random generators preferably is a pseudo-random generator that in particular generates pseudo-random numbers.

The present invention can be used for arbitrary imprints. It can be particularly advantageously applied in connection with a franking machine. The imprint is therefore advantageously a franking imprint.

The present invention furthermore concerns an arrangement for generation of an imprint with a printing device operating according to a dot matrix principle (in particular an inkjet principle) that is controlled by a control device, the control device being provided with a dot pattern for the imprint and the printing device is fashioned to generate on a substrate image points corresponding to the provided dot pattern when controlled by the control device. According to the invention, the control device is fashioned to predetermine for the image point a probability with which the image point is generated; to determine whether the image point is generated in a decision step using a random algorithm and the probability, and to control the printing device such that the image point is generated dependent on the result of the decision step. Furthermore, the invention concerns a franking machine with such an inventive arrangement.

The variants and advantages described above with regard to the method can be realized to the same degree with this inventive arrangement or the inventive franking machine.

DESCRIPTION OF THE PREFERRED EMBODIMENTS

Figure 1:
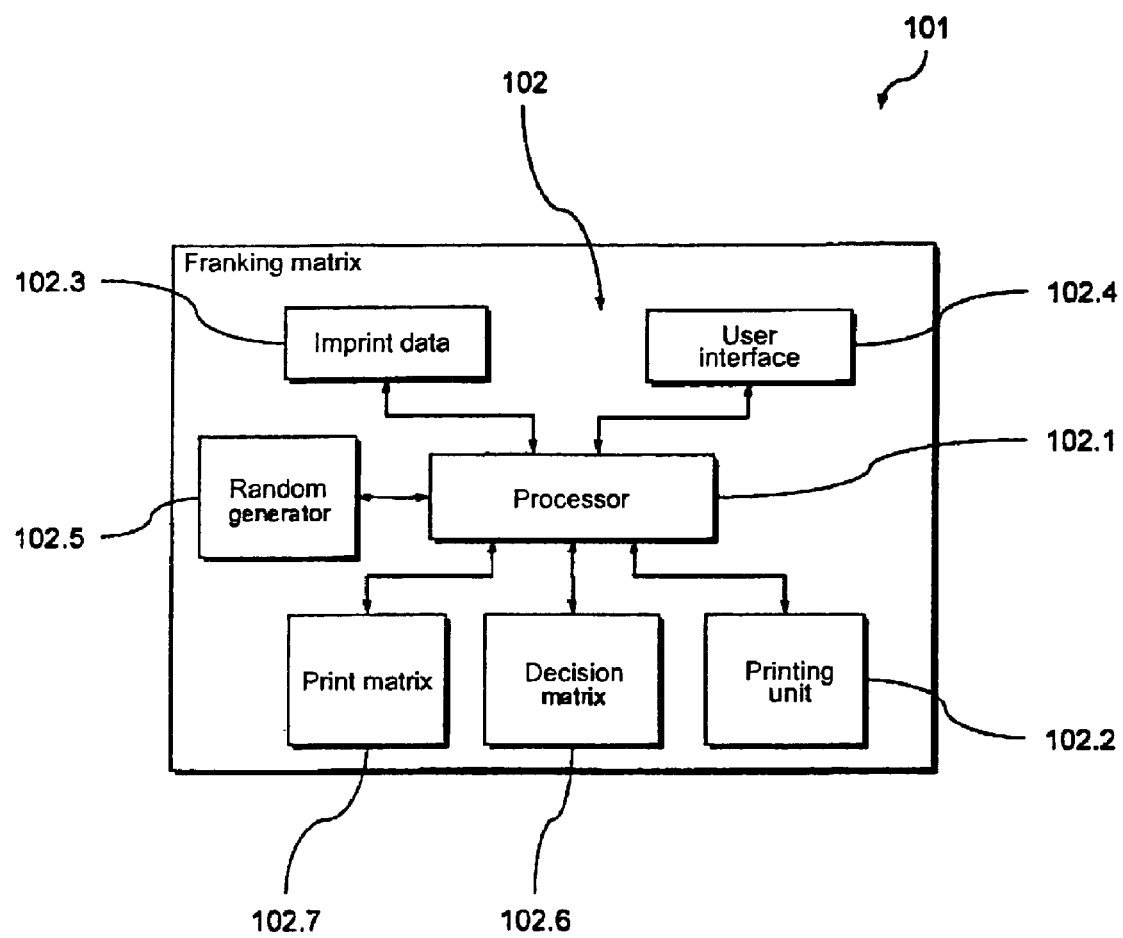
FIG. 1 schematically illustrates a preferred embodiment of a franking machine with an inventive arrangement for generation of an imprint with which a preferred variant of the inventive method for generation of an imprint can be implemented.
Figure 2:
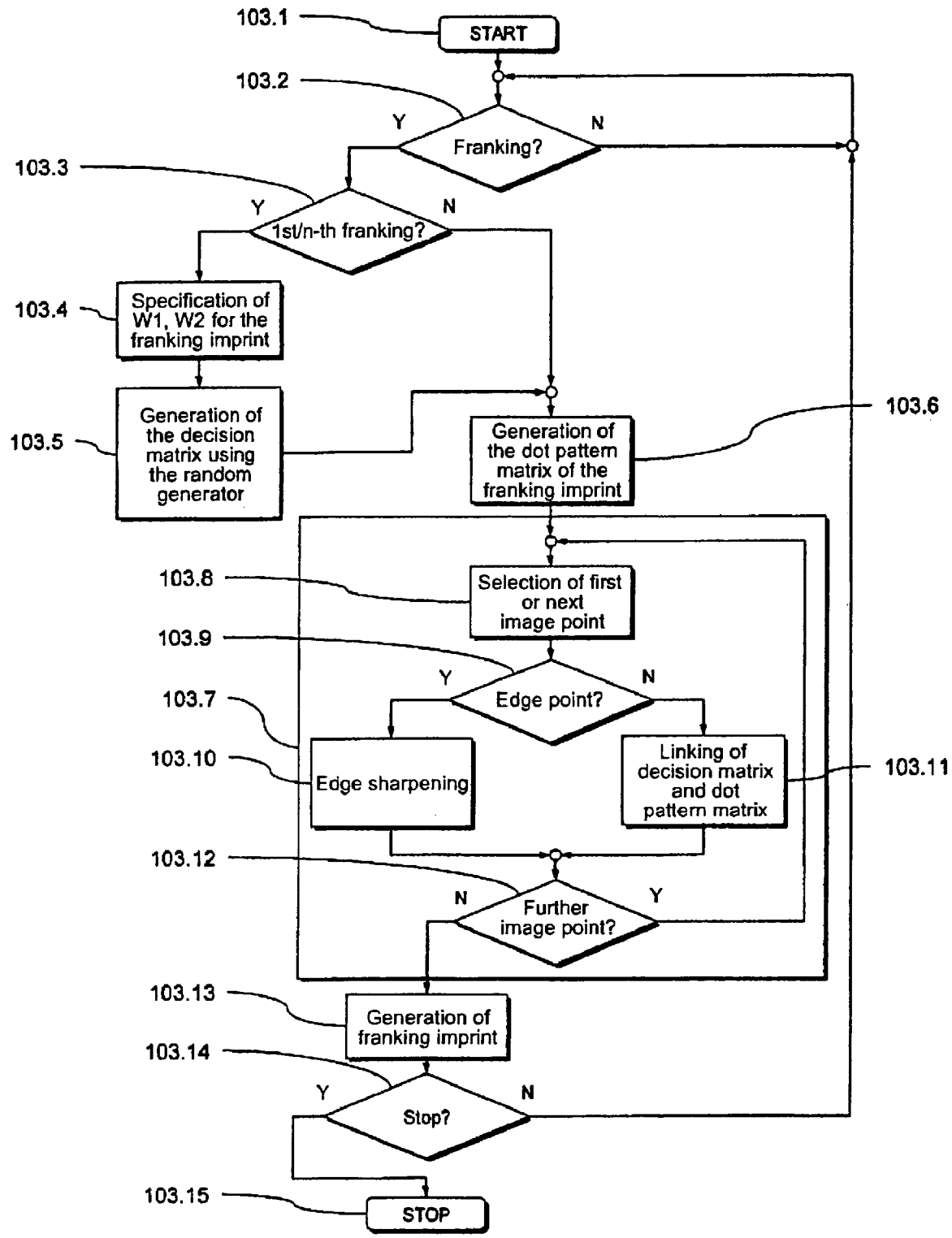
FIG. 2 is a flowchart diagram of a preferred variant of the inventive method for generation of an imprint, which can be implemented with the arrangement from FIG. 1.

A preferred exemplary embodiment of the inventive franking machine 101 for generation of a franking imprint is shown in FIGS. 1 and 2, with which a preferred variant of the inventive method is implemented for generation of a franking imprint.

For generation of the franking imprint, the franking machine 101 comprises a preferred embodiment of the inventive arrangement 102 with a control device in the form of a processor 102.1 and a printing device 102.2 connected therewith. The printing device 102.2 has an inkjet print head, and thus operates according to a known dot matrix principle that need not be described herein in detail.

Controlled by the processor 102.1, the printing device 102.2 generates the franking imprint from a plurality of image points that it generates on a corresponding substrate (for example a letter) with individual ink droplets.

To generate the franking imprint, among other things the processor 102.1 accesses in a known manner imprint data that are stored in an imprint data memory 102.3 and that define the fundamental design and sub-division of the franking imprint. In the present example the franking imprint has, in its most comprehensive form, three different regions with different print image types, namely a two-dimensional barcode, a one-dimensional barcode and a cliche portion with alphanumerical characters and/or free graphics.

Furthermore, the processor 102.1 processes variable data for the franking imprint that are input either by the user of the franking machine 101 via a user interface 102.4 or via peripheral devices (not shown in FIG. 1) such as, for example, a scale. From all of these data the processor 102.1 can determine a dot pattern which represents the franking imprint.

In the present example the dot pattern exhibits a first resolution of 300×300 dpi while the print head of the printing device 102.2 exhibits a second resolution of 300×600 dpi. Due to the resolution of the printing device 102.2 that is doubled in one direction, two image points (namely a first image point and a second image point) are associated with each point of the dot pattern. However, it is understood that, in other variants, the present invention can also be applied to other ratios of the first and second resolution, in particular also to identical first and second resolutions.

The method workflow of the inventive method is initially started in a step 103.1. In a step 103.2 it is then checked whether a franking should ensue, thus whether a franking imprint should be generated. The generation of the franking imprint is normally initiated by the user of the franking machine 101 by a corresponding input via a user interface 102.3 of the arrangement 102.

If this is the case, in a step 105.3 it is checked whether the present franking is the first or an n-th franking according to a corresponding count of the processor 102.1. The number n can be arbitrarily predetermined by the manufacturer of the franking machine and/or by the user of the franking machine with $n \geqq 1$. If applicable, the value for n can also be modified by the manufacturer of the franking machine and/or the user of the franking machine, under the circumstances dependent on arbitrarily predetermined criteria.

If the franking is the first or an n-th franking, a first probability W1 is provided for the first image points of the franking imprint and a second probability W2 is provided for the second image points of the franking imprint. The respective probability W1 or W2 defines the probability with which the respective image point should actually be generated (i.e. printed).

In the present example the first probability W1 corresponds to the second probability W2. However, it is understood that the two probabilities W1, W2 can exhibit different values in other variants of the invention.

The specification of the respective probability W1, W2 can ensue using a corresponding algorithm established in the manufacture of the franking machine 101. Alternatively, specific inputs of the user of the franking machine via the user interface 102.4 also may be required or also taken into account. A optimization algorithm can be implemented that modifies the probabilities W1, W2 using properties of a previous franking imprint captured automatically or by the user, in order to optimize the print quality.

In the present example the specification of the probabilities W1, W2 ensues uniformly for the entire franking imprint by specification of a number from 0 to 100. However, it is understood that in other variants of the invention the probabilities can be predetermined dependent on the position of the respective image point in a franking imprint. It is in particular possible to provide different probabilities W1, W2 for the regions with different print image types (two-dimensional barcode, one-dimensional barcode and cliché region).

A decision matrix is then generated by the processor 102.1 in a subsequent step 103.5. For each image point of the franking imprint, this decision matrix renders in a suitable manner whether the image point in question should be printed or not. In the present example the decision matrix is a binary matrix with the values "0" (don't print) and "1" (print) that is stored in a decision matrix memory 102.6 of the franking machine 101.

The decision matrix is generated using a random generator in that, for each image point of the imprint, the processor 102.1 accesses a random algorithm stored in a random generator memory 102.5. In the present example the random algorithm is a pseudo-random algorithm that generates a pseudo-random number in a number range from 1 to 100 upon each execution. Such pseudo-random algorithms are known, such that a detailed description is not needed herein. It is likewise understood that any other real or pseudo-random generator can also be used in other variants of the invention.

The probability W1=W2=x previously provided for the respective image point sub-divides the number range of the random algorithm into a first sub-range from 0 to x and a second sub-range from x+1 to 100. If the random number generated by the random algorithm lies in the first sub-range, the appertaining image point should be printed and the corresponding point of the decision matrix is set to "1". If the random number generated by the random algorithm lies in the second sub-range, the appertaining image point should not be printed and the corresponding point of the decision matrix is set to "0".

It is understood that in other variants of the invention only a portion of the decision matrix is generated in the manner just described, and the decision matrix is then composed by multiple repetitions of this portion of the decision matrix.

A dot pattern matrix for the current franking imprint to be generated is subsequently generated by the processor 102.1 in a step 103.6. This dot pattern matrix is generated using the dot pattern for the current franking imprint and comprises all image points of the franking imprint. It is again a binary matrix, whereby the value "0" defines that the corresponding image point corresponding to the dot pattern is basically not to be printed while the value "1" defines that the corresponding image point corresponding to the dot pattern would be printed in principle.

It is understood that the generation of the dot pattern matrix is independent of the generation of the decision matrix and therefore, in other variants of the invention, can also ensue at an arbitrarily different point in time before the generation of the decision matrix.

In a step 103.7 a binary print matrix is then generated using the dot pattern matrix and the decision matrix. This binary print matrix establishes for all image points whether the appertaining image point should actually be printed (value "1") or not (value "0"). For this the first (in the order of the image points) or, respectively, the next (given subsequent image points) image point to be treated is initially selected in a step 103.8. The print matrix is thereby stored in a print matrix memory 102.7 of the franking machine 101.

In a step 103.9 it is then checked whether this image point is an edge point defining a contour of the franking imprint. If this is the case, in a decision step 103.11 an edge sharpening algorithm is executed by the processor 102.1. For such an edge point a probability WR (similar to the probabilities W1, W2 described above) can in turn be provided which defines with which probability such an edge point should be printed. Using the random algorithm, the processor 102.1 can then in turn determine whether the appertaining edge point should actually be printed (value "1") or not (value "0") and writes the corresponding value into the print matrix.

Different probabilities WR can thereby be provided depending on the design of the edge sharpening algorithm. These probabilities WR preferably lie above 80%, up to 100%.

If the current image point is not an edge point, in a decision step 103.11 the value for the matrix is determined via a simple "AND" linking of the value of the decision matrix associated with this image point and the value of the dot pattern matrix associated with this image point. However, it is understood that any other linking of the decision matrix and the dot pattern matrix can ensue in other variants of the invention; in particular further decision criteria can have influence.

In a step 103.12 it is then checked whether the value of the print matrix is to be determined for a further image point of the imprint. If this is the case, the method jumps back to the step 103.8.

Otherwise, the generation of the franking imprint by the printing device 102.2 ensues in a step 103.13, whereby the printing ensues via the processor 102.1 using the print matrix store in the print matrix memory 102.7.

Ultimately, the area coverage or the thinning of the franking imprint (and therewith the consumed quantity of ink) can be set in a simple manner via the predeterminable probability W1, W2 for the printing of the individual image points while the random generator ensures in a simple manner that no regular, interfering patterns form in the appertaining region of the franking imprint. In other words, a simple regulation of the degree of the thinning on the one hand and a reliable avoidance of interfering, regular patterns on the other hand are possible with the present invention.

The newly-ensuing generation of the decision matrix after every n-th franking furthermore ensures that a random, disadvantageous decision matrix is not used over a longer time span, such that an advantageous area coverage or thinning of the franking imprint is ensured in the long term.

In a step 103.14 it is finally checked whether the method workflow should be ended. If this is the case, the method workflow is ended in a step 103.14. Otherwise the method jumps back to the step 103.2.

It is understood that a series of modifications of the method workflow just described is possible. In other variants of the invention, a determination of the decision matrix (step 103.5) in advance can be omitted. Rather, in the step 103.11, the value of the print matrix for the appertaining image point can be determined immediately using the probability associated with the image point and the random generator.

The memory of the franking machine 101 described in the preceding can be fashioned wholly or in part as separate memory modules or as individual memory ranges of a single memory module.

The present invention was described in the preceding exclusively using the example of a franking machine, but it is understood that the invention can also be used in connection with arbitrarily different applications in which a corresponding imprint should be generated.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for generating an imprint composed of image points on a substrate using a printing device, comprising the steps of:

in a control arrangement for a printing device, providing a dot pattern for an imprint comprised of image points represented by said dot pattern;

with said control arrangement, controlling generation of said imprint on a substrate by said printing device by, for at least one of said image points, identifying a probability with which said one of said image points is generated, generating a random output from a random generator and making an electronic decision, based on said random output and said probability, as to whether said one of said image points is or is not generated on said substrate when printing said imprint, and printing said imprint with said printing device with said one of said image points printed or not printed in said imprint dependent on said electronic decision; and for a second of said image points, identifying a second probability with said control arrangement with which said second of said image points is generated on said substrate, generating a second random output and making a further electronic decision as to whether said second of said image points is or is not generated in said imprint based on said second probability and said second random output, and printing said imprint on said substrate with said printing device with said second of said image points being generated or not generated in said imprint dependent on said further electronic decision.

2. A method as claimed in claim 1 comprising:
employing a dot pattern exhibiting a predetermined first resolution;
employing a printing device exhibiting a maximum second resolution that is greater than said first resolution; and
associating at least said first image point and said second image point with at least one dot of said dot pattern.

3. A method as claimed in claim 2 comprising
employing a printing device having said second resolution that is m times said first resolution of said dot pattern, wherein m is a whole number; and
associating m image points with said at least one dot of said dot pattern.

4. A method as claimed in claim 2 comprising predetermining at least one of said first probability or said second probability dependent on a position of said at least one dot in said dot pattern.

5. A method as claimed in claim 1 comprising setting said second probability equal to said first probability.

6. A method as claimed in claim 1 comprising employing a single random generator as both said first random generator and said second random generator.

7. A method as claimed in claim 1 wherein said imprint comprises a plurality of different regions of respectively different print image types, and comprising employing a dot pattern having respectively different pattern regions respectively corresponding to said different regions of said imprint, and comprising predetermining at least one of said first probability or said second probability dependent on the pattern region in which said at least one dot is located.

8. A method as claimed in claim 1 comprising predetermining at least one of said first probability or said second probability depending on whether said at least one dot is an edge dot defining a contour of said imprint.

9. A method as claimed in claim 8 comprising setting said at least one of said first probability or said second probability to at least 80% when said at least one dot is an edge point defining a contour of said imprint.

10. A method for generating an imprint composed of image points on a substrate using a printing device, comprising the steps of:
in a control arrangement for a printing device, providing a dot pattern for an imprint comprised of image points represented by said dot pattern;
with said control arrangement, controlling generation of said imprint on a substrate by said printing device by, for at least one of said image points, identifying a probability with which said one of said image points is generated, generating a random output from a random generator and making an electronic decision, based on said random output and said probability, as to whether said one of said image points is or is not generated on said substrate when printing said imprint, and printing said imprint with said printing device with said one of said image points printed or not printed in said imprint dependent on said electronic decision; and
with said random generator, generating random numbers in a predetermined number range and, in said control arrangement, subdividing said number range into a first sub-range and at least one second sub-range, and generating a random number in said number range for said image point, as said random output; and
in said control arrangement, making said electronic decision by deciding that said image point is generated in said imprint on said substrate when said random number is within said first sub-range, and said image point is not generated in said imprint on said substrate when said random number is within said second sub-range.

11. A method for generating an imprint composed of image points on a substrate using a printing device, comprising the steps of:
in a control arrangement for a printing device, providing a dot pattern for an imprint comprised of image points represented by said dot pattern;
with said control arrangement, controlling generation of said imprint on a substrate by said printing device by, for at least one of said image points, identifying a probability with which said one of said image points is generated, generating a random output from a random generator and making an electronic decision, based on said random output and said probability, as to whether said one of said image points is or is not generated on said substrate when printing said imprint, and printing said imprint with said printing device with said one of said image points printed or not printed in said imprint dependent on said electronic decision; and
for at least one region of said dot pattern in which said at least one image point is represented, generating a decision matrix using said probability and said random output, said decision matrix establishing, for all image points represented in said region of said dot pattern, whether the respective image points represented in said region of said dot pattern are generated or not generated in said imprint; and
making said electronic decision for said at least one image point using said decision matrix.

12. A method as claimed in claim 11 comprising:
generating a dot pattern matrix at least for said region of said dot pattern in which said at least one image point is located;
generating a print matrix by a point-by-point linking of said dot pattern matrix with said decision matrix; and
generating said imprint on said substrate using said print matrix.

13. A method as claimed in claim 11 comprising generating said decision matrix anew at predetermined intervals.

14. A method as claimed in claim 13 comprising generating said decision matrix anew after every $n^{th}$ imprint generation.

15. A method as claimed in claim 1 comprising employing a pseudo-random generator that generates pseudo-random numbers as said random generator.

16. A method as claimed in claim 1 comprising generating a franking imprint on said substrate as said imprint.

17. An arrangement for generating an imprint composed of image points on a substrate using a printing device, comprising:
a printing device;
a control arrangement for said printing device having access to a dot pattern for an imprint comprised of image points represented by said dot pattern; and
said control arrangement controlling generation of said imprint on a substrate by said printing device by, for at least one of said image points, identifying a probability with which said one of said image points is generated, generating a random output from a random generator and making an electronic decision, based on said random output and said probability, as to whether said one of said image points is or is not generated on said substrate when printing said imprint; and
said printing device printing said imprint with said one of said image points printed or not printed in said imprint dependent on said electronic decision by said control arrangement; and
said control arrangement for a second of said image points, identifying a second probability with which said second of said image points is generated on said substrate, and generates a second random output and making a further electronic decision as to whether said second of said image points is or is not generated in said imprint based on said second probability and said second random output, and said printing device printing said imprint on said substrate with said second of said image points being generated or not generated in said imprint dependent on said further electronic decision by said control arrangement.

18. An arrangement as claimed in claim 17 wherein
said dot pattern exhibits a predetermined first resolution,
said printing device exhibits a maximum second resolution that is greater than said first resolution, and
said control arrangement associates at least said first image point and said second image point with at least one dot of said dot pattern.

19. An arrangement as claimed in claim 18 wherein
said second resolution is m times said first resolution of said dot pattern,
wherein m is a whole number, and wherein said control arrangement associates m image points with said at least one dot of said dot pattern.

20. An arrangement as claimed in claim 18 wherein said control arrangement uses, as at least one of said first probability or said second probability, a predetermined probability that is dependent on a position of said at least one dot in said dot pattern.

21. An arrangement as claimed in claim 17 wherein said control arrangement sets said second probability equal to said first probability.

22. An arrangement as claimed in claim 17 wherein said control arrangement employs a single random generator as both said first random generator and said second random generator.

23. An arrangement as claimed in claim 17 wherein said imprint comprises a plurality of different regions of respectively different print image types, and wherein said control arrangement employs a dot pattern having respectively different pattern regions respectively corresponding to said different regions of said imprint, and uses, as at least one of said first probability or said second probability, a predetermined probability that is dependent on the pattern region in which said at least one dot is located.

24. An arrangement as claimed in claim 17 wherein said control arrangement uses, as at least one of said first probability or said second probability, a predetermined probability that is dependent on whether said at least one dot is an edge dot defining a contour of said imprint.

25. An arrangement as claimed in claim 24 wherein said control arrangement sets said at least one of said first probability or said second probability to at least 80% when said at least one dot is an edge point defining a contour of said imprint.

26. An arrangement for generating an imprint composed of image points on a substrate using a printing device, comprising:
a printing device;
a control arrangement for said printing device having access to a dot pattern for an imprint comprised of image points represented by said dot pattern; and
said control arrangement controlling generation of said imprint on a substrate by said printing device by, for at least one of said image points, identifying a probability with which said one of said image points is generated, generating a random output from a random generator and making an electronic decision, based on said random output and said probability, as to whether said one of said image points is or is not generated on said substrate when printing said imprint;
said printing device printing said imprint with said one of said image points printed or not printed in said imprint dependent on said electronic decision by said control arrangement; and
said control arrangement, with said random generator, generating random numbers in a predetermined number range and subdividing said number range into a first sub-range and at least one second sub-range, and generating a random number in said number range for said image point, as said random output, and making said electronic decision by deciding that said image point is generated in said imprint on said substrate when said random number is within said first sub-range, and said image point is not generated in said imprint on said substrate when said random number is within said second sub-range.

27. An arrangement for generating an imprint composed of image points on a substrate using a printing device, comprising:
a printing device;
a control arrangement for said printing device having access to a dot pattern for an imprint comprised of image points represented by said dot pattern; and
said control arrangement controlling generation of said imprint on a substrate by said printing device by, for at least one of said image points, identifying a probability with which said one of said image points is generated, generating a random output from a random generator and making an electronic decision, based on said random output and said probability, as to whether said one of said image points is or is not generated on said substrate when printing said imprint;
said printing device printing said imprint with said one of said image points printed or not printed in said imprint dependent on said electronic decision by said control arrangement; and
said control arrangement, for at least one region of said dot pattern in which said at least one image point is represented, generating a decision matrix using said probability and said random output, said decision matrix establishing, for all image points represented in said region of said dot pattern, whether the respective image points represented in said region of said dot pattern are generated or not generated in said imprint, and making said electronic decision for said at least one image point using said decision matrix.

28. An arrangement as claimed in claim 27 wherein said control arrangement generates a dot pattern matrix at least for said region of said dot pattern in which said at least one image point is located, and generates a print matrix by a point-by-point linking of said dot pattern matrix with said decision matrix, and wherein said printing device generates said imprint on said substrate using said print matrix.

29. An arrangement as claimed in claim 28 herein said control arrangement generates said decision matrix anew at predetermined intervals.

30. An arrangement as claimed in claim 29 wherein said control arrangement generates said decision matrix anew after every $n^{th}$ imprint generation.

31. An arrangement as claimed in claim 17 wherein said control arrangement employs a pseudo-random generator that generates pseudo-random numbers as said random generator.

32. An arrangement as claimed in claim 17 wherein said printing device generates a franking imprint on said substrate as said imprint.

* * * * *